(12) United States Patent
Seo et al.

(10) Patent No.: US 9,112,644 B2
(45) Date of Patent: Aug. 18, 2015

(54) SIGNAL TRANSMISSION METHOD AND APPARATUS IN A RELAY COMMUNICATION SYSTEM

(75) Inventors: Han-Byul Seo, Gyeonggi-Do (KR); Hak-Seong Kim, Gyeonggi-Do (KR); Ki-Jun Kim, Gyeonggi-Do (KR); Soon-Yil Kwon, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 843 days.

(21) Appl. No.: 13/263,721

(22) PCT Filed: Apr. 7, 2010

(86) PCT No.: PCT/KR2010/002134
§ 371 (c)(1),
(2), (4) Date: Oct. 7, 2011

(87) PCT Pub. No.: WO2010/117208
PCT Pub. Date: Oct. 14, 2010

(65) Prior Publication Data
US 2012/0033603 A1    Feb. 9, 2012

Related U.S. Application Data

(60) Provisional application No. 61/168,209, filed on Apr. 9, 2009, provisional application No. 61/177,633, filed on May 12, 2009, provisional application No. 61/251,271, filed on Oct. 13, 2009, provisional (Continued)

(51) Int. Cl.
*H04L 5/00* (2006.01)
*H04W 84/04* (2009.01)

(52) U.S. Cl.
CPC .............. *H04L 5/001* (2013.01); *H04L 5/0053* (2013.01); *H04L 5/0094* (2013.01); *H04W 84/047* (2013.01)

(58) Field of Classification Search
CPC .............. H04L 5/0007; H04L 27/2646; H04L 27/2666; H04L 5/02; H04J 11/0083
See application file for complete search history.

(56) References Cited

U.S. PATENT DOCUMENTS

2008/0186950 A1    8/2008  Zhu et al.
2011/0317597 A1*  12/2011  Wan et al. .................... 370/281

FOREIGN PATENT DOCUMENTS

JP    2008-172792    7/2008
WO   2009/041779    4/2009

(Continued)

OTHER PUBLICATIONS

LG Electronics, "Resource Allocation and Downlink Control Channel Structure for Relay Backhaul Link," R1-091194, 3GPP TSG RAN WG1 Meeting #56bis, Mar. 2009.

(Continued)

*Primary Examiner* — Alvin Zhu
(74) *Attorney, Agent, or Firm* — Lee, Hong, Degerman, Kang & Waimey (57) ABSTRACT

The present invention relates to a data transmission/receiving method and apparatus in a relay communication system. In particular, the data transmission/receiving method through a backhaul link between a base station and a relay node in a relay communication system comprises: composing a backhaul subframe including a control signal transmission period to which a control signal is allocated and a backhaul signal transmission period to which a backhaul signal is allocated and then allocating the backhaul signal; transmitting configuration information about the backhaul subframe, the information containing symbol position or size data of the backhaul signal transmission period, to the relay node through an upper layer signal; and transmitting the backhaul signal having been allocated through the backhaul subframe to the relay node.

8 Claims, 9 Drawing Sheets

Related U.S. Application Data application No. 61/265,729, filed on Dec. 1, 2009, provisional application No. 61/251,701, filed on Oct. 14, 2009, provisional application No. 61/313,089, filed on Mar. 11, 2010.

(56) References Cited

FOREIGN PATENT DOCUMENTS

| WO | 2009/126586 | 10/2009 |
|---|---|---|
| WO | 2010/006285 | 1/2010 |
| WO | 2010/033065 | 3/2010 |
| WO | 2010/039739 | 4/2010 |
| WO | 2010/117200 | 10/2010 |

OTHER PUBLICATIONS

Research in Motion, UK Limited, "Relay Link Control Signalling," R1-091151, 3GPP TSG RAN WG1 Meeting #56bis, Mar. 2009.

Catt, "Considerations for TDD Relay Frame Structure", 3GPP TSG RAN WG1 meeting #56bis, R1-091523, Mar. 2009, 6 pages.

Nokia Siemens Networks, et al., "Further Aspects of Control Channel for Relay Backhaul link," 3GPP TSG RAN WG1 Meeting #57bis, R1-092565, Jun. 2009, 4 pages.

Huawei, "R-PDCCH Design," 3GPP TSG RAN WG1 Meeting #58, R1-093042, Aug. 2009, 7 pages.

Panasonic, "Relay Control Issues," 3GPP TSG-RAN WG1 Meeting 58, R1-093462, Aug. 2009, 6 pages.

* cited by examiner

SIGNAL TRANSMISSION METHOD AND APPARATUS IN A RELAY COMMUNICATION SYSTEM

CROSS-REFERENCE TO RELATED APPLICATIONS

This application is a 371 U.S. national stage application of International Application No. PCT/KR2010/002134, filed on Apr. 7, 2010, which claims priority to U.S. Provisional Application Ser. Nos. 61/313,089, filed on Mar. 11, 2010, 61/265,729, filed on Dec. 1, 2009, 61/251,701, filed on Oct. 14, 2009, 61/251,271, filed on Oct. 13, 2009, 61/177,633, filed on May 12, 2009, and 61/168,209, filed on Apr. 9, 2009, the contents of which are incorporated by reference herein in their entirety.

TECHNICAL FIELD

The present disclosure relates to a data transmission/receiving method and apparatus in a relay communication system, and more particularly, a method for configuring a backhaul subframe according to communication environments and a data transmission/receiving method and apparatus using the same.

BACKGROUND ART

Service frequency ranges are getting extended in the recent communication networks and radiuses of cells are gradually decreased for supporting (covering) high-speed communication and more traffic. Thus, many problems may be caused in view of applying the conventional centralized cellular radio network as it is even later. That is, since a position of the base station is fixed, flexibility of a radio link configuration is low. As a result, it has been difficult to efficiently provide communication services in a radio (wireless) environment where there is a rapid change in traffic distribution and call demands.

To address such problems, a relay, more particularly, a multi-hop relay has been considered in the next generation wireless communication system, called as Long Term Evolution Advanced (LTE-A) system or an Evolved Universal Terrestrial Radio Access (E-UTRA) system. The relay system can broaden cell service coverage by covering a partial shadow area generated within a cell region, increase system capacity, and reduce an initial installation charge since a relay (hereinafter, referred to as 'relay station (RS)') is established in an initial stage when a service request is not frequently made.

A communication channel between a base station and a terminal in a relay system may be configured (established) by a direct link between the base station and the terminal, or by a link between the base station and the terminal via a relay node (RN). Here, a communication channel established between the base station and the relay node is referred to as a backhaul link.

Communication methods using the backhaul link channel may be divided into an in-band backhauling and an out-band backhauling. The in-band backhauling is a method in which frequency resources are dynamically shared between a backhaul communication and a terminal communication, whereas the out-band backhauling is a method in which frequency resources for the backhaul communication are different from those of the terminal communication.

During a backhaul signal transmission via the backhaul link, a propagation delay generally occurs according to communication environments. Therefore, since a backhaul signal transmitted via the backhaul link is designed by considering the propagation delay, available resources of a backhaul link channel may change, other than fixed, depending on communication environments.

That is, the resources available as the backhaul signal are decreased in a communication environment causing a long propagation delay, while being relatively increased in a communication environment causing a short propagation delay.

DISCLOSURE OF THE INVENTION

Therefore, an aspect of the detailed description is to provide a method and apparatus for transmitting a signal by controlling a configuration of a backhaul subframe according to communication environments.

To achieve these and other advantages and in accordance with the purpose of the present invention, as embodied and broadly described herein, there is provided a data transmission/receiving method and apparatus through a backhaul link between a base station and a relay node in a relay communication system including composing a backhaul subframe including a control signal transmission period to which a control signal is allocated and a backhaul signal transmission period to which a backhaul signal is allocated and then allocating the backhaul signal, transmitting configuration information about the backhaul subframe, the information containing symbol position or size data of the backhaul signal transmission period, to the relay node through an upper layer signal, and transmitting the backhaul signal having been allocated through the backhaul subframe to the relay node.

Preferably, the backhaul subframe configuration information may include a position of a first symbol and/or a position of a last symbol of the backhaul signal transmission period.

Preferably, the backhaul subframe configuration information may include the number of symbols and a position of a first symbol or a position of a last symbol of the backhaul signal transmission period.

Preferably, the backhaul subframe configuration information may include the number of symbols allocated by the relay node as the control signal transmission period.

Preferably, the backhaul subframe may be a Multicast Broadcast Single Frequency Network (MBSFN) subframe in which one or two symbols are allocated as the control signal transmission period.

Preferably, the backhaul subframe may further include an uplink signal reception period, and the backhaul subframe may be a special subframe, which is located between a downlink subframe and an uplink subframe to transmit a downlink signal to the relay node during the backhaul signal transmission period and receive an uplink signal from the relay node during the uplink signal reception period.

Preferably, the backhaul subframe configuration information may be index information about one-to-one correspondence between the number of symbols allocated as the control signal transmission period and the backhaul subframe structure.

To achieve these and other advantages and in accordance with another exemplary embodiment, there is provided a signal transmission method, in a signal transmission/receiving method through a backhaul link between a base station and a relay node and an access link between the relay node and a terminal in a relay communication system, the method including determining a timing relation between a first subframe to which a backhaul signal transmitted/received through the backhaul link is allocated and a second subframe to which a signal transmitted/received through the access link is allocated, transmitting position information related to the last symbol to which the backhaul signal of the first subframe is allocated based on the determined timing relation, and forwarding the backhaul signal to the relay node through the first subframe, wherein the first subframe variously changes in configuration by adjusting the number of symbols to which the backhaul signal is allocated according to communication environments.

Preferably, the first subframe may be aligned with the second subframe with matching timing each other by setting a symbol preceding the last symbol of the first subframe as a last symbol position of the backhaul signal area.

Preferably, the second subframe may be aligned with delayed by a predetermined offset from the first subframe by setting the last symbol of the first subframe as the last symbol position of the backhaul signal area.

Preferably, the transmitting of the last symbol position information may be that Dedicated Reference Signal (DRS) pattern information used in the backhaul signal area is determined by the last symbol position.

To achieve these and other advantages and in accordance with one exemplary embodiment, there is a signal transmission apparatus, in a data transmission/reception apparatus through a backhaul link between a base station and a relay node in a relay communication system, the apparatus including a resource allocating unit to allocate a backhaul signal by composing a backhaul subframe, the backhaul subframe containing a control signal transmission period to which a control signal is allocated and a backhaul signal transmission period to which a backhaul signal is allocated, and a transmitter to transmit configuration information about the backhaul subframe, the information containing symbol position or size data of the backhaul signal transmission period, and the backhaul signal allocated through the backhaul subframe to the relay node.

Preferably, the backhaul subframe configuration information may include at least one of a first symbol position and a last symbol position of the backhaul signal transmission period, the number of symbols of the backhaul signal transmission period and the number of symbols allocated as the control signal transmission period.

To achieve these and other advantages and in accordance with another exemplary embodiment, there is a signal transmission apparatus, in a signal transmission/reception apparatus through a backhaul link between a base station and a relay node and an access link between the relay node and a terminal in a relay communication system, the apparatus including a controller to determine a timing relation between a first subframe to which a backhaul signal transmitted/received through the backhaul link is allocated and a second subframe to which a signal transmitted/received through the access link is allocated, and a transmitter to transmit position information related to the last symbol, to which the backhaul signal of the first subframe is allocated based on the determined timing relation, and the backhaul signal, wherein the controller variously changes the first subframe configuration by adjusting the number of symbols to which the backhaul signal is allocated according to communication environments.

Preferably, the controller may align the first subframe and the second subframe to match timing thereof by setting a symbol preceding the last symbol of the backhaul signal area of the first subframe as the last symbol position, or align the second subframe with being delayed by a predetermined offset from the first subframe by setting the last symbol of the backhaul signal area of the first subframe as the last symbol position.

ADVANTAGEOUS EFFECT

In accordance with the detailed description, a backhaul signal can be transmitted and received by controlling resources available as the backhaul signal according to communication environments, which results in the maximization of utilization of backhaul resources.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

A communication system used herein is a system for providing various communication services such as voice data, packet data and the like, and includes a base station, a relay node and a terminal. Herein, Long Term Evolution Advanced (LTE-A) system or an Evolved Universal Terrestrial Radio Access (E-UTRA) system will be described as a representative example.

The term 'terminal' used herein may be replaced with other terms, such as Subscriber Station (SS), User Equipment (UE), Mobile Equipment (ME), Mobile Station (MS) and the like. Also, the terminal may be a type of portable device having a communication function such as a cellular phone, PDA, a smart phone, a notebook and the like, or a non-portable device such as PC, vehicle-mounted device and the like.

A relay node (RN) according to the present disclosure may be replaced with other terms, such as a relay, a Relay Station (RS) and the like, and installed between a base station and a terminal to relay transmitted and received signals, thereby serving to cover a partial shadow area generated within a cell region, broaden cell service coverage, and increase system capacity. Also, the RN may be configured as a multi-hop relay node for effectively relaying data traffic generated between the base station and the terminal. The RN may be fixed to one position or have mobility.

The term 'base station' used herein refers to a fixed position communicating with the terminal, and be replaced with other terms, such as evolved-NodeB (eNB), Base Station (BS), Base Transceiver System (BTS), Access Point (AP) and the like. One or more cells may exist in one base station, and an interface for transmission of user traffic and control traffic may be used between base stations. Also, downlink refers to a communication channel from the base station to the terminal, and uplink refers to a communication channel from the terminal to the base station.

Multi-access schemes applied to the wireless communication system may include Code Division Multiple Access (CDMA), Time Division Multiple Access (TDMA), Frequency Division Multiple Access (FDMA), Single Carrier-FDMA (SC-FDMA), Orthogonal Frequency Division Multiple Access (OFDMA) or other known modulation schemes.

Also, multiple access schemes for the downlink transmission and the uplink transmission may differ. For example, the downlink transmission may employ an OFDMA scheme, and the uplink transmission may employ an SC-FDMA scheme.

Hereinafter, embodiments of the present invention will be described below in detail with reference to the accompanying drawings where those components are rendered the same reference number that are the same or are in correspondence, regardless of the figure number, and redundant explanations are omitted.

Figure 1:
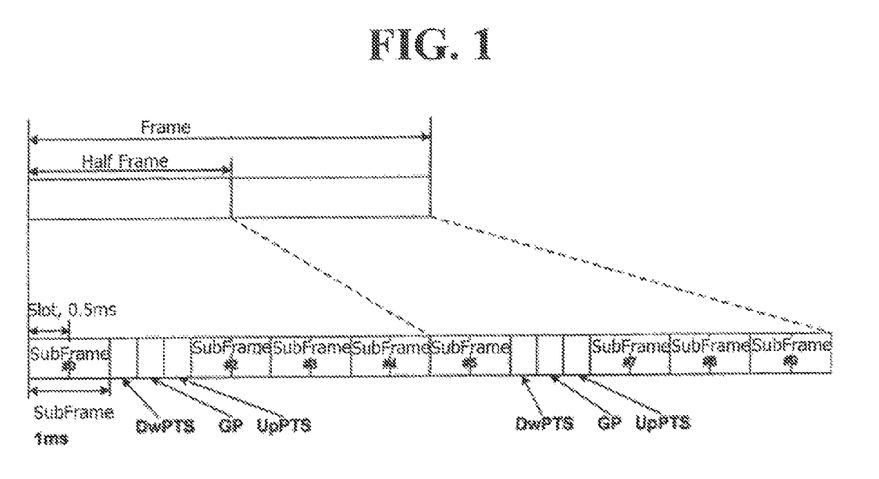
FIG. 1 illustrates a TDD frame structure of 3GPP LTE system.

FIG. 1 illustrates a TDD frame structure in 3GPP LTE system.

As illustrated in FIG. 1, a frame of the 3GPP LTE system is composed of 10 subframes #0 to #9. Each subframe includes 7 Orthogonal Frequency Division Multiple (OFDM) symbols in a normal Cyclic Prefix (CP) and 6 OFDM symbols in an extended Cyclic Prefix (CP).

A special subframe is present at a switching point between downlink and uplink transmissions. Especially, switching from uplink transmission to downlink transmission is only an intra-cell switching. However, upon switching from downlink transmission to uplink transmission, a high power downlink transmission from a base station may cause interference with uplink reception of an adjacent base station, accordingly, the special subframe is required at the switching point from downlink to uplink transmission.

The special subframe includes Downlink Pilot Time Slot (DwPTS), Guard Period (GP) and Uplink Pilot Time Slot (UpPTS). The length of the special subframe may be less than 1 ms. GP is a period for covering a hardware switching time and a timing advance for compensating for a propagation delay between a base station and a terminal. Especially, the GP is used as a guard period for removing interference generated in uplink due to a multipath delay of a downlink signal. DwPTS is a downlink transmission period of control information and data, and understood as a general downlink subframe. The DwPTS is especially used for an initial cell search, synchronization or channel estimation. UpPTS is a period for uplink transmission, especially, used for a shortened random access channel (RACH) transmission for synchronization between Sounding Reference Signal (SRS) for channel estimation at a base station and uplink transmission of a terminal.

Figure 2:
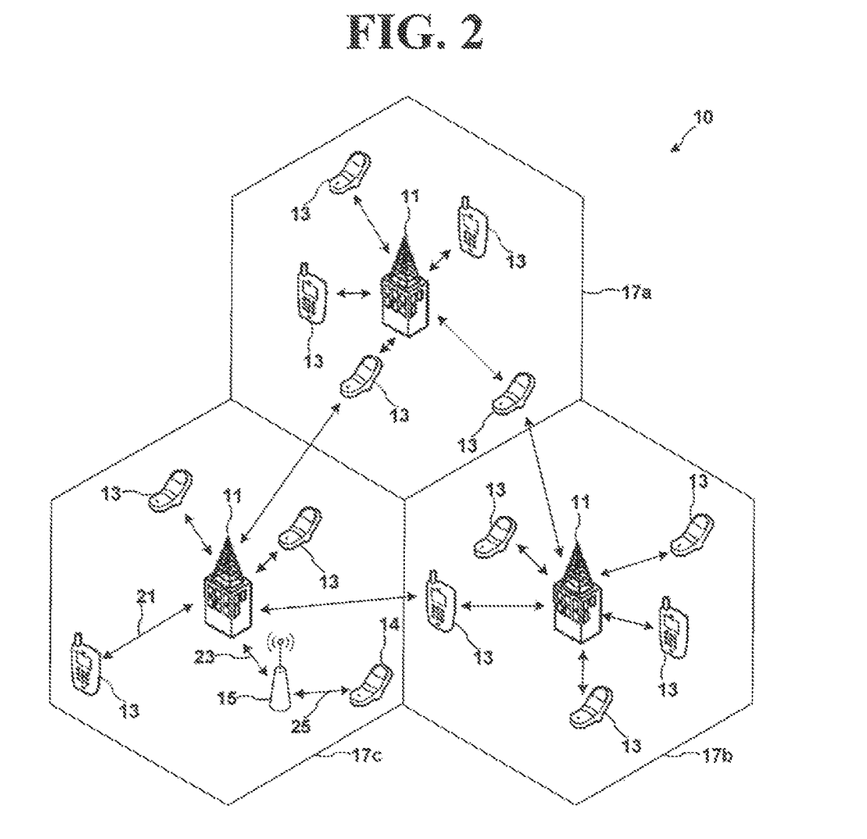
FIG. 2 is an overview illustrating a relay type wireless communication system to which this specification is applied.

FIG. 2 illustrates a relay type wireless communication system to which the present disclosure is applied.

As illustrated in FIG. 2, a wireless communication system 10 includes at least one base station 11. Each base station 11 may provision communication services with respect to one or more cells 17a, 17b and 17c. Each cell 17a, 17b and 17c may be divided into a plurality of sectors (not shown). A terminal may communicate with the at least one base station 11.

In terms of establishment of a communication channel, the base station 11 may establish a channel with the terminal 13 via a direct link 21, or via links 23 and 25 by way of a relay node 15. Here, the channel 23 established between the base station 11 and the relay node 17, especially, a downlink channel is referred to as a backhaul channel. For example, in 3GPP LTE system, the backhaul link 23 may include a Relay Physical Downlink Shared Channel (R-PDSCH) for data transmission from the base station 11 to the relay node 15 and a Relay Physical Downlink control Channel (R-PDCCH) for transmission of control information. Also, the channel 25 established between the relay node 15 and the terminal 14, especially, a downlink channel is referred to as an access link.

Subframes in which the relay node 15 receives a backhaul signal from the base station 11 via the backhaul link may be classified into a Multicast Broadcast Single Frequency Network (MBSFN) subframe or a special subframe.

Figure 3:
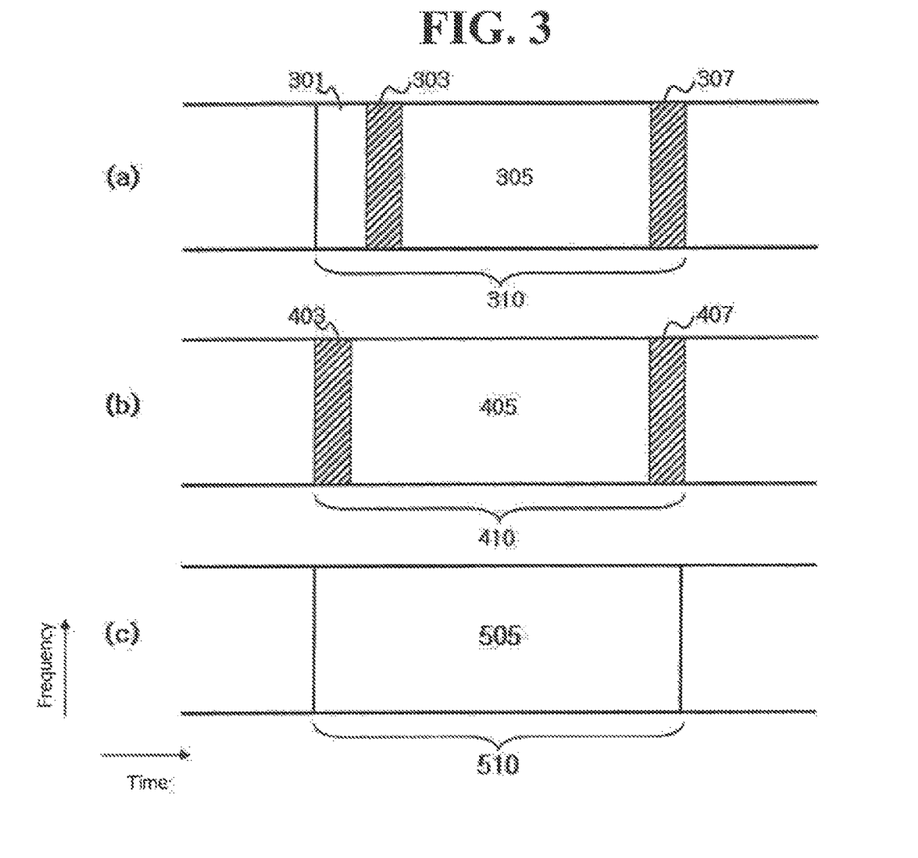
FIG. 3 illustrates a format of a backhaul link signal using MBSFN subframe.

FIG. 3 illustrates a structure of a backhaul subframe. FIG. 3A illustrates a format of a backhaul link signal using the MBSFN subframe.

The structure of an MBSFN subframe used at the relay node may include a control channel transmission period 301, a backhaul signal transmission period 305 and guard periods 303 and 307.

The control channel transmission period 301 is a PDCCH or Physical Hybrid-ARQ Indicator Channel (PHICH) period to which control signals of terminals 13 connected to the relay node 15 are transmitted, and may include at least one to four OFDM symbol transmission periods. The relay node 15 may transmit a control signal to the terminal 14 connected thereto during the control channel transmission period 301.

Also, a guard period 303, which corresponds to a transition gap for switching from a transmit mode Tx to a receive mode Rx of the relay node 15, is interposed between the control channel transmission period 301 and the backhaul signal transmission period 305. In some cases, the base station may transmit a garbage signal during the guard period 303. Here, the garbage signal may be an insignificant random signal sent by the base station or a random signal, which the base station detects in a waiting state without transmission of a specific signal without power-off of its transmitter. A time for which the base station transmits the garbage signal may be recognized as a guard period from the perspective of the relay node. Similarly, a guard period 307, which corresponds to a transition gap for switching from the receive mode Rx to the transmit mode Tx of the relay node 15, may be located after the backhaul signal transmission period 305.

Accordingly, the relay node 15 may be unable to receive or transmit a signal at a symbol of the guard periods 303 and 307 corresponding to the transition gaps. Hence, a signal which the relay node 15 has to receive should be transmitted at a symbol within a period where the transition has been completed other than a symbol within a period where the transition is being carried out. According to this reason, there is a limitation to the number of symbols of a subframe that the relay node 15 is actually able to use as a backhaul in the backhaul link subframe.

Referring to FIG. 3, a backhaul signal transmitted from the base station to the relay node may typically have a fixed backhaul subframe structure. In the fixed backhaul subframe structure, a relay node may transmit a control signal, such as PDCCH or PHICH, to a terminal in the control signal transmission period 301, and thereafter perform a mode switching from a transmit mode to a receive mode in the guard period 303. Then, the relay node may receive a backhaul signal from the base station in the backhaul signal reception period 305. The relay node may then switch from the receive mode to the transmit mode in the guard period 307 and prepare a control signal transmission to the terminal in the subsequent subframe. The base station may appropriately transmit a backhaul signal to the relay node according to the backhaul sub frame structure.

According to a backhaul signal transmission method using the MBSFN subframe structure, the relay node transmits only a control signal by utilizing a part of transmission periods, and the downlink data transmission period 305 of the relay node as the rest of the transmission periods is left blank without downlink traffic. Consequently, the partially blank transmission period 305 can be utilized as a backhaul signal reception period of the relay node.

The data transmission/reception method using the MBSFN subframe may be performed without major difficulties when sizes or positions of the control signal transmission period 301, the guard periods 303 and 307 and the backhaul signal transmission period 305 are fixed (set) in every subframe. However, it may be sometimes necessary to use each period by adjusting, instead of fixing, a length thereof depending on communication environments such as the number of transmit antennas, a channel state and the like. For example, when the relay node uses one or two antennas, then the number of OFDM symbols of the control signal transmission period 301, which is used for PDCCH transmission in the backhaul subframe, may be set to one or two. Hence, even if the lengths of the guard periods 303, 307 are fixed, the length and position of the backhaul signal reception period 305 in each backhaul subframe may change in response to the changes in the PDCCH length 301.

Thus, the change in the backhaul subframe structure according to the communication environments may be required in another structure of backhaul subframe other than the MBSFN subframe.

FIG. 3B illustrates a fully blank backhaul subframe structure. A backhaul subframe, which is transmitted via a backhaul link between a base station and a relay node, may be set to have a fully blank subframe structure without a control signal transmission period for the control signal transmission of the relay node.

A fully blank backhaul subframe 410 illustrated in FIG. 3B may include guard periods 403 and 407 and a backhaul signal reception period 405. The main difference between the fully blank backhaul subframe 410 and the MBSFN subframe 310 illustrated in FIG. 3A is that the control signal transmission period 301 of FIG. 3A can be used as a guard period 403 or a backhaul signal transmission/reception period 405 of FIG. 3B. Therefore, the number and positions of OFDM symbols allocated to a backhaul signal may differ in the MBSFN subframe 310 and in the fully blank subframe 410, and the relay node is unable to transmit a control signal through the fully blank backhaul subframe structure.

In order to normally receive the backhaul signal transmitted through the fully blank backhaul subframe structure, the number and positions of the OFDM symbols of a backhaul signal should be appointed between the base station and the relay node.

Also, the link between the base station and the relay node may configure a backhaul subframe in an uplink band (FDD mode) or an uplink subframe (TDD mode) by applying UL/DL band swapping or UL subframe steeling. Since the backhaul subframe may not include PDCCH and the base station may change its transmit/receive mode at the boundary of the backhaul subframe, the backhaul subframe structure may be configured similar to the fully blank subframe structure. That is, two guard periods are defined at boundary regions of the subframes and all the rest of OFDM symbols may be allocated for a backhaul signal.

FIG. 3C illustrates a backhaul subframe structure according to an out-band backhauling method.

The out-band backhauling is a method in which data transmission and reception via a backhaul link between a base station and a relay node are carried out using frequency resources independent of those used for data transmission and reception via an access link between the relay node and a terminal. In accordance with one exemplary embodiment of the out-band backhauling, the base station and the relay node have a plurality of downlink carriers, respectively, and some of the carriers may be allocated as a backhaul downlink from the base station to the relay node, and the other carriers may be allocated as a backhaul uplink from the relay node to a base station. In the out-band backhauling, a terminal connected to the relay node does not have to listen to a carrier used as a backhaul link, so, as illustrated in the drawing, a control signal transmission period is not allocated to the backhaul subframe. Also, similar to the out-band backhauling, a full duplex relaying is introduced in which the relay node can receive a backhaul signal from the base station and simultaneously transmit a downlink signal to a terminal connected thereto at the same time/frequency.

Hereinafter, description will be given of a backhaul signal transmission/reception method through a backhaul subframe in which a backhaul signal transmission period changes in size according to communication environments, such as the number of transmit antennas, a channel state or the like.

When the structure of a backhaul subframe changes according to environments, information indicating the changed structure of the backhaul subframe should be exchanged between the base station and the relay node. Accordingly, a backhaul subframe configuration message may be forwarded via a high (upper) layer signaling or the like.

The backhaul subframe configuration message may include information required to determine a position of a backhaul signal within a backhaul subframe allocated from the base station to the relay node. For example, the backhaul subframe configuration message may indicate the position of the first or last symbol of OFDM symbols allocated as a backhaul signal area, or the number of OFDM symbols within the backhaul signal area in addition to the position of the first or last symbol. As another method, such message may indicate a control signal transmission period or the size of PDCCH.

Figure 4:
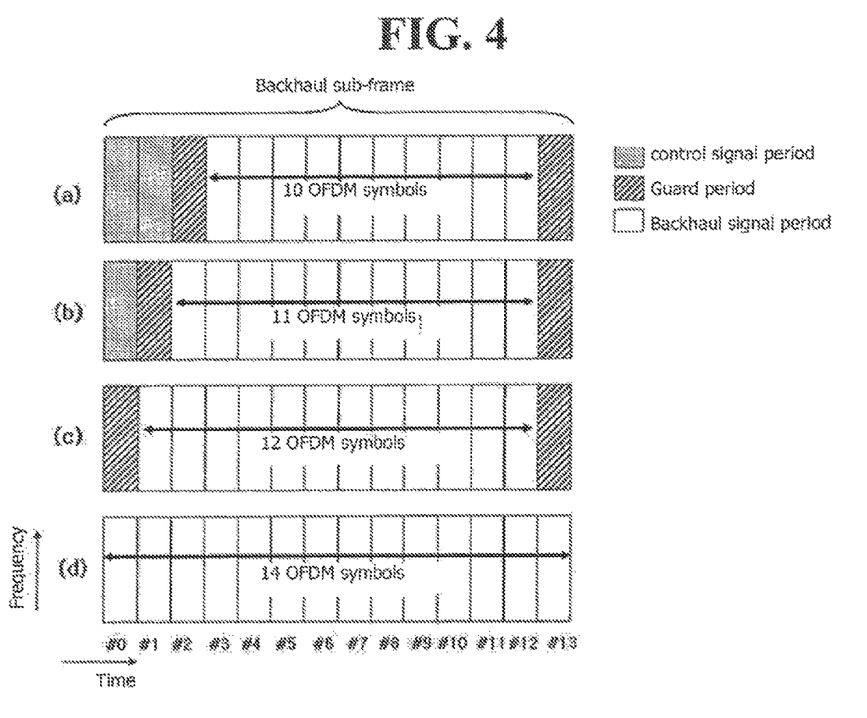
FIG. 4 illustrates an exemplary embodiment of a variable structure of a backhaul subframe.

FIG. 4 illustrates one exemplary embodiment of a variable backhaul subframe structure.

FIG. 4A illustrates a case where one subframe in a normal CP consists of 14 OFDM symbols when the relay node has four antenna ports in MBSFN subframe. That is, the MBSFN subframe has a structure that two OFDM symbols #0, #1 are allocated as a control signal period, the third OFDM symbol #2 and the last OFDM symbol #13 are allocated as guard periods, respectively, and the other 10 OFDM symbols #3 to #12 are allocated as a backhaul signal period. A configuration message indicating the structure of a backhaul subframe may include position information about OFDM symbols #3 and #12 corresponding to the first and last positions of a backhaul signal, and in some cases, include position information about OFDM symbol #3 indicating the first position of the backhaul signal and length information (10 symbols) about the backhaul signal period.

FIG. 4B illustrates a case where one subframe in a normal CP consists of 14 OFDM symbols when the number of antenna ports of the relay node is 1 or two in MBSFN subframe. Unlike FIG. 4A, one OFDM symbol #0 is allocated as a control signal period, OFDM symbol #1 and OFDM symbol #13 are allocated as guard periods, respectively, and the other 12 OFDM symbols #2 to #12 are allocated as a backhaul signal period. Similarly, the MBSFN subframe configuration message may include position information about OFDM symbols #2 and #12 indicating the first and last positions of a backhaul signal, or position information about OFDM symbol #2 indicating the first position of the backhaul signal and length information (11 symbols) about the backhaul signal period. As aforementioned, the backhaul signal period of the MBSFN subframe may be variably configured in its size and symbol positions depending on communication environments, such as the number of antenna ports of the relay node and the length of the control signal period.

FIG. 4C illustrates one exemplary embodiment of a fully blank backhaul subframe structure, in which two OFDM symbols #0, #13 are allocated as guard periods, respectively, and the other 12 OFDM symbols #1 to #12 are allocated as a backhaul signal period. The fully blank backhaul subframe configuration message may include position information about OFDM symbols #1, #12 indicating the first and last positions of a backhaul signal. In some cases, the variable fully blank backhaul subframe configuration message may also include position information about OFDM symbol #1 indicating the first position of a backhaul signal and length information (12 symbols) about a backhaul signal period.

FIG. 4C illustrates the subframe structure according to the out-band backhauling or full duplex relaying. Since the control information period such as PDCCH or the guard period is not present, all of the 14 OFDM symbols can be used for backhaul signal transmission and reception.

An effective backhaul communication may be implemented by selecting one of the MBSFN subframe, the fully blank subframe and the out-band backhauling subframe illustrated in FIG. 4, according to communication environments. Also, even if the backhaul subframe structure changes, a receiving side may receive a normal backhaul signal through the configuration message indicating the backhaul subframe structure. In this case, a base station and the relay node may exchange index information relating to a selected backhaul subframe structure, thereby reducing signaling overhead of backhaul subframe configuration signals.

With one-to-one correspondence between the number of PDCCH symbols and a backhaul subframe structure, it is possible to set a backhaul subframe structure without an explicit configuration message for the backhaul subframe structure. Here, the backhaul subframe according to the out-band backhauling or full duplex relaying does not have a PDCCH symbol, so the one-to-one correspondence between the number of OFDM symbols allocated as PDCCH and the backhaul subframe structure may be improper.

Preferably, the backhaul subframe structure in which the backhaul signal period is variable in size and position may be determined by the number of OFDM symbols allocated as PDCCH, through one-to-one correspondence between the number of PDCCH symbols and the backhaul subframe structure.

For example, for a backhaul subframe structure capable of allowing the MBSFN subframe structure of FIGS. 4A and 4B and the fully blank subframe structure of FIG. 4C, one-to-one correspondence may be made by allocating two OFDM symbols, one OFDM symbol and zero OFDM symbol, respectively, with respect to PDCCH. That is, the relay node transmits PDCCH using the first two OFDM symbols in the backhaul subframe of FIG. 4A, transmits PDCCH using the first OFDM symbol in the backhaul subframe of FIG. 4B, and does not transmit PDCCH by leaving a subframe fully blank or by UL/DL band swapping in the backhaul subframe of FIG. 4C.

In accordance with another exemplary embodiment, the first symbol position of a backhaul signal can be calculated based on PCFICHs of the base station and the relay node. Here, PCFICH refers to the number of OFDM symbols used for PDCCH transmission. The method for calculating the first symbol position of the backhaul signal based on PCFICH will be given by Formula 1.

Start Symbol index=max{Base station PCFICH, Relay node PCFICH+1}    Formula 1

PCFICH may have a value of 0, 1, 2, 3 or 4. When the PCFICH of the relay node is 0, leaving the subframe fully blank or UL/DL band swapping may be carried out, accordingly, it may indicate that the relay node does not transmit PDCCH.

The following Table 1 shows one example of a start symbol index according to a variety of PCFICH values. Here, the start symbol index is set to 0 for out-band backhaul.

TABLE 1

| No | 1 | 2 | 3 | 4 | 5 | 6 | 7 | 8 | 9 | 10 | 11 | 12 |
|---|---|---|---|---|---|---|---|---|---|---|---|---|
| Base station PCFICH | 1 | 1 | 1 | 2 | 2 | 2 | 3 | 3 | 3 | 4 | 4 | 4 |
| Relay Node PCFICH | 0 | 1 | 2 | 0 | 1 | 2 | 0 | 1 | 2 | 0 | 1 | 2 |
| Start symbol index | 1 | 2 | 3 | 2 | 2 | 3 | 3 | 3 | 3 | 4 | 4 | 4 |

In the subframes illustrated in FIGS. 4A, 4B and 4C, a guard period length is one OFDM symbol, but it may change by considering a mode switching time of the relay node and a propagation delay. When an OFDM symbol is not allocated as PDCCH or a backhaul signal area, the relay node may determine that the OFDM symbol has been allocated as a guard period, accordingly, the guard period length and position can be signaled by an implicit method.

The proposed backhaul subframe configuration scheme may also be applied similar to an extended CP (one subframe consists of 12 OFDM symbols).

A type of a control channel to be detected by a relay node in a backhaul link subframe may differ according to the configuration of the backhaul link subframe. When employing the backhaul subframes of FIGS. 4A, 4B and 4C, the relay node should detect R-PDCCH through which its own control information is transmitted. That is, when the relay node performs a half-duplex operation within an access link frequency band for communication between the relay node and a terminal, the relay node should detect the R-PDCCH according to the applied backhaul subframe configuration. On the contrary, when employing the subframe illustrated in FIG. 4D, since the relay node performs a full-duplex operation or out-band relaying operation within a frequency band for communication between the relay node and the terminal, the relay node can detect PDCCH through which control information relating to the terminal is transmitted.

For detection of the control channel, the relay node may preferably have two different IDs for the control channel detection. One of the two IDs is to detect R-PDCCH, and the other ID is to detect PDCCH. The relay node may have its Rel-8 Cell Radio Network Temporary Identifier (C-RNTI) for detection of PDCCH, and use a newly defined Relay RNTI (R-RNTI) for detection of R-PDCCH. The R-RNTI may be induced from an allocated C-RNTI, and be a type of function of C-RNTI of the relay node.

As aforementioned, a backhaul subframe configuration message may include information related to start and end positions of a backhaul link signal or information related to start position and length of a backhaul link signal. However, in some cases, the configuration message may include information related to the maximum number of OFDM symbols used as PDCCH. The base station may transmit to the relay node information related to constraint of the maximum number of OFDM symbols used for PDCCH transmission of the relay node, through a high layer signaling, and the relay node may inform the base station of the maximum number of OFDM symbols used for the PDCCH transmission through a high layer signaling.

The configuration message for the backhaul transmission and reception may be applied to both a control channel such as R-PDCCH or PDCCH and a data channel such as R-PDSCH or PDSCH. The configuration message may also be applied to R-PDCCH by determining the configuration of the R-PDSCH by way of dynamically setting setup fields, such as a start position, an end position and/or a length of a subframe, included in the R-PDCCH. For convenience of a control channel decoding, the R-PDSCH may be variably configured through a high layer signaling or a dynamic signaling at R-PDCCH with the configuration of the R-PDCCH fixed. When the R-PDSCH is variably configured through the dynamic signaling, the number of OFDM symbols, which the relay node can use for the control channel transmission, may be constrained by a high layer signal. The R-PDCCH and R-PDSCH may be allocated different OFDM symbols through TDM or different subcarriers through FDM, so as to be separated from each other.

The start position of the backhaul link signal may be calculated based on the number of OFDM symbols used as the guard period. The start position calculation method may be generalized by Formula 2.

$$\text{Start symbol index} = \max\{\text{Base station PCFICH, Relay node PCFICH}+n\} \quad \text{Formula 2}$$

where n(n=0, 1, 2, 3 . . . ) denotes the number of OFDM symbols required as the guard period.

The end position of the backhaul link signal may be subject to a timing relation between a backhaul link (a link between a base station and a relay node) and an access link (a link between a relay node and a terminal).

Figure 5:
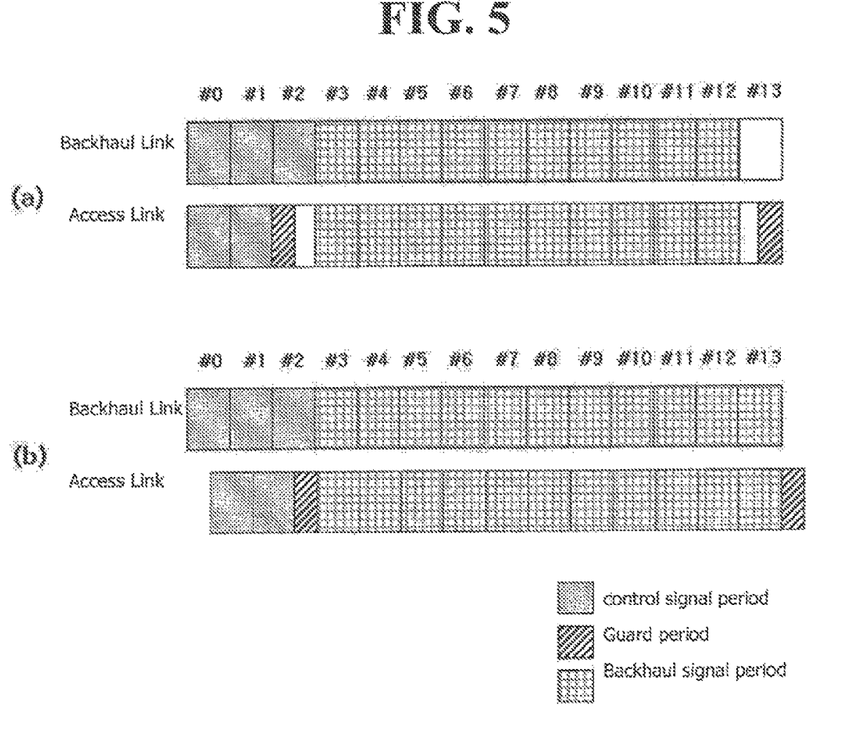
FIG. 5 illustrates a timing relation between a backhaul link and an access link.

FIG. 5 illustrates a timing relation between the backhaul link and the access link.

FIG. 5A illustrates a structure of aligning boundaries of backhaul link subframes and access link subframes, which shows that totally 10 OFDM symbols are allocated for a backhaul link signal transmission and reception. As illustrated in FIG. 5A, since about a half length of a symbol is allocated as a guard period for mode switching of the relay node in each of the third symbol #2 and the last symbol #3 in the access link subframe, it can be understood that the last OFDM symbols #13 of the backhaul link subframe and the access link subframe cannot be used for the backhaul signal transmission and reception.

FIG. 5B illustrates a structure of aligning backhaul link subframes and access link subframes by alternating each other by a predetermined offset interval, which shows that the access link subframes are aligned with being delayed by about a half symbol. As illustrated in FIG. 5B, since the access link subframe is delayed by a half symbol length corresponding to a guard period, the last OFDM symbol #13 is utilized for a backhaul signal transmission and reception, so totally 11 OFDM symbols are allocated for the backhaul signal transmission and reception. Therefore, if a configuration message indicates that the last OFDM symbol of the subframe is used as a backhaul link, it indicates the structure that the backhaul link subframe and the access link subframe are aligned with being delayed by a preset offset interval. If the configuration message indicates that the last OFDM symbol of the backhaul subframe is not used as a backhaul link, a timing relation may be determined as indicating the structure that the boundaries between the backhaul link subframe and the access link subframe are aligned. A last symbol position setup message for the backhaul link signal may be transmitted through a high layer signaling. Also, the last position of the backhaul link signal may be set by determining the timing relation between the backhaul link and the access link. That is, if the backhaul link and the access link are set to be aligned with each other, the last symbol of the backhaul link subframe may be set not to be used. On the contrary, if the backhaul link and the access link are aligned with delayed by a preset offset, the last symbol of the backhaul link subframe may be set to be used.

As described, the setup of the backhaul link signal has been described for downlink transmission. Alternatively, the backhaul link signal setting method may be equally applied to uplink transmission that the relay node transmits the backhaul signal to the base station.

The configuration of the backhaul link may also be applied to backhaul signal transmission and reception using a special subframe.

Figure 6:
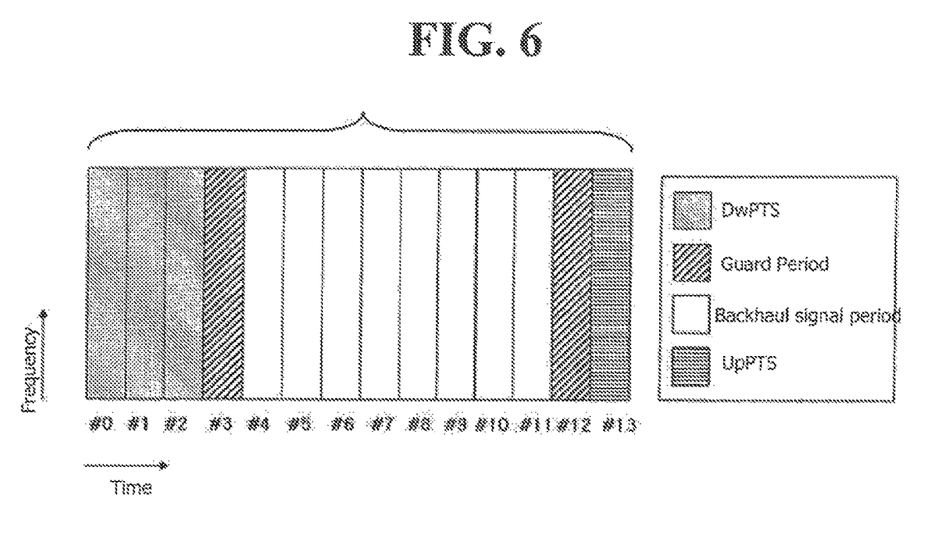
FIG. 6 illustrates an exemplary embodiment of a variable structure of a special subframe.

FIG. 6 illustrates one exemplary embodiment of a variable special subframe structure.

A relay node transmits a downlink signal to a terminal during DwPTS period consisting of at least three OFDM symbols in the special subframe. Afterwards, one symbol #3 is allocated as a guard period, and transmission of a backhaul signal is started from the fifth OFDM symbol #4. Also, the last OFDM symbol #13 in the backhaul subframe is allocated as UpPTS period, and one symbol #12 preceding the last symbol #13 may be allocated as a guard period for mode switching of the relay node. Therefore, the transmission position of the backhaul signal in the special subframe may be composed of OFDM symbols from #4 to #12.

The start position of the backhaul signal in the special subframe may be fixed or determined through signaling of a high layer or physical layer. The last position of the backhaul signal may be flexibly determined through a high layer signaling based on a propagation delay of a backhaul link, a required guard period length and UpPTS size.

A position of OFDM symbol to which a reference signal is allocated may depend on a reference signal allocation, so the configuration of the backhaul signal may be designed in association with the reference signal used in the backhaul link.

Figure 7:
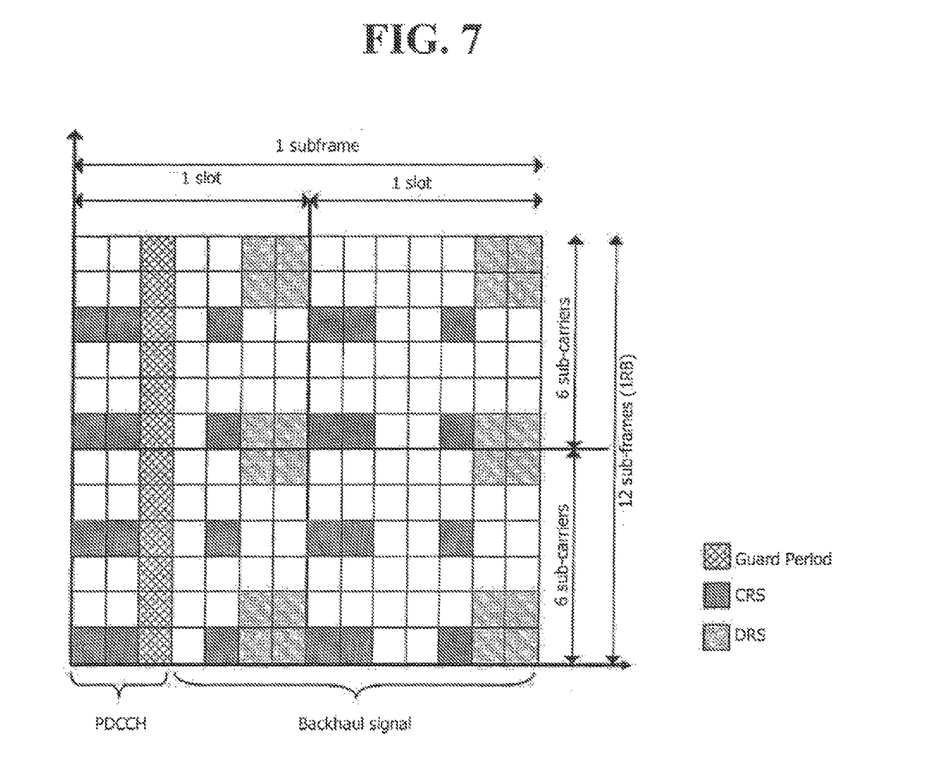
FIG. 7 illustrates a reference signal allocation in a backhaul link in accordance with one exemplary embodiment.

FIG. 7 illustrates a reference signal allocation in a backhaul link in accordance with one exemplary embodiment.

A reference signal is a designated transmission signal which a transmitting side and a receiving side have already known, namely, a signal to recognize distortion of a transmit signal when receiving from the transmitting side to the receiving side through a transmission channel. In general, the reference signal is used for channel information acquisition and/or data demodulation, and includes a Cell-specific Reference Signal (Common Reference Signal) (CRS) shared by every terminal present within a cell, and a Dedicated Reference Signal (DRS) for a specific terminal.

The CRS is used for acquisition of channel state information and handover measurement. A terminal may inform a base station 11 and a relay node 15 of feedback information, such as Channel Quality Information (CQI), Precoding Matrix Indicator (PMI) and Rank Indicator (RI), by measuring the CRS. The base station 11 or the relay node 15 may perform scheduling of a downlink frequency area using the feedback information received from the terminal 14.

The DRS is a reference signal for data demodulation, namely, a reference signal transmitted by being included in the corresponding resource when a base station transmits downlink data. A relay node or a terminal performs a channel estimation by receiving the corresponding reference signal and demodulates the received data. Therefore, the reference signal for the data demodulation may be transmitted by being included in an area where data is transmitted.

Referring to FIG. 7, as a case where the last OFDM symbol of the backhaul subframe has been set to be used as a backhaul signal, it may be configured such that a UE specific RS or dedicated RS is used in the backhaul link.

Figure 8:
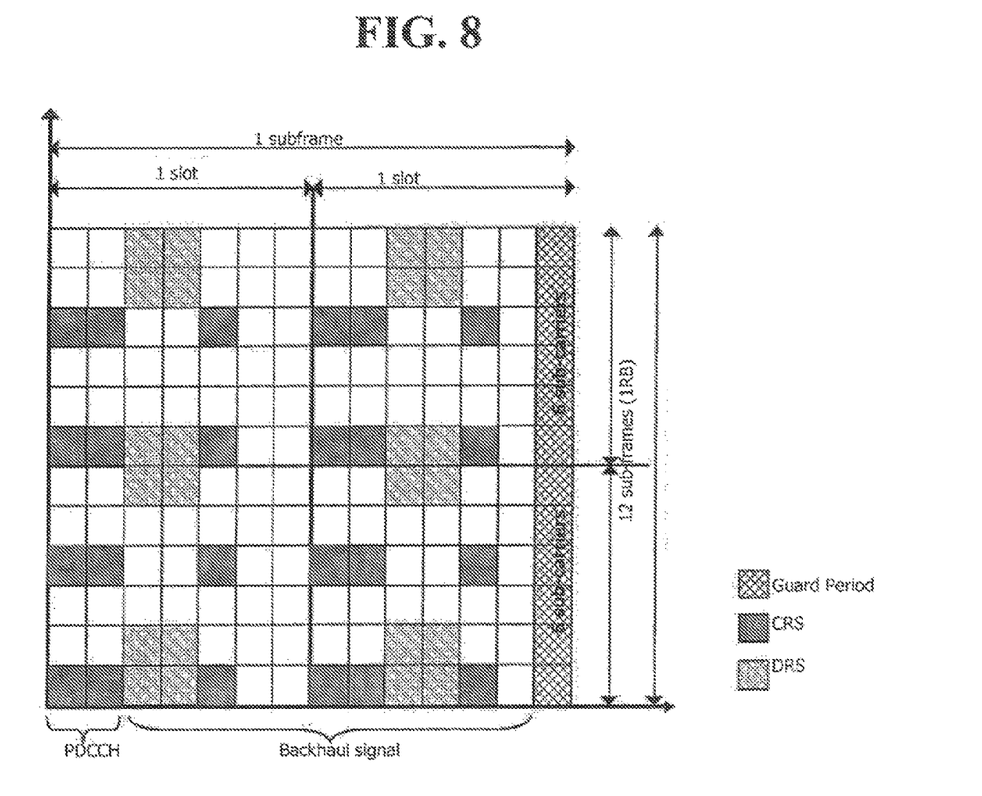
FIG. 8 illustrates a reference signal allocation in a backhaul link in accordance with another exemplary embodiment.

FIG. 8 illustrates a reference signal allocation in a backhaul link in accordance with another exemplary embodiment.

FIG. 8 shows a case where the last OFDM symbol of the backhaul subframe has been set not to be used as a backhaul signal. Unlike FIG. 7, the UE specific RS or dedicated RS is not allocated in the last OFDM symbol, and the last OFDM symbol is set as a guard period. In this case, a DRS pattern designed in DwPTS area of a special subframe having 11 or 12 OFDM symbols in TDD mode may be used in a backhaul signal area as illustrated.

Therefore, the backhaul signal is started from the third OFDM symbol to which the DRS is allocated and the maximum PDCCH size of each of the base station and the relay node may correspond to two OFDM symbols or one OFDM symbol. The PDCCH may include a guard period in some cases.

Figure 9:
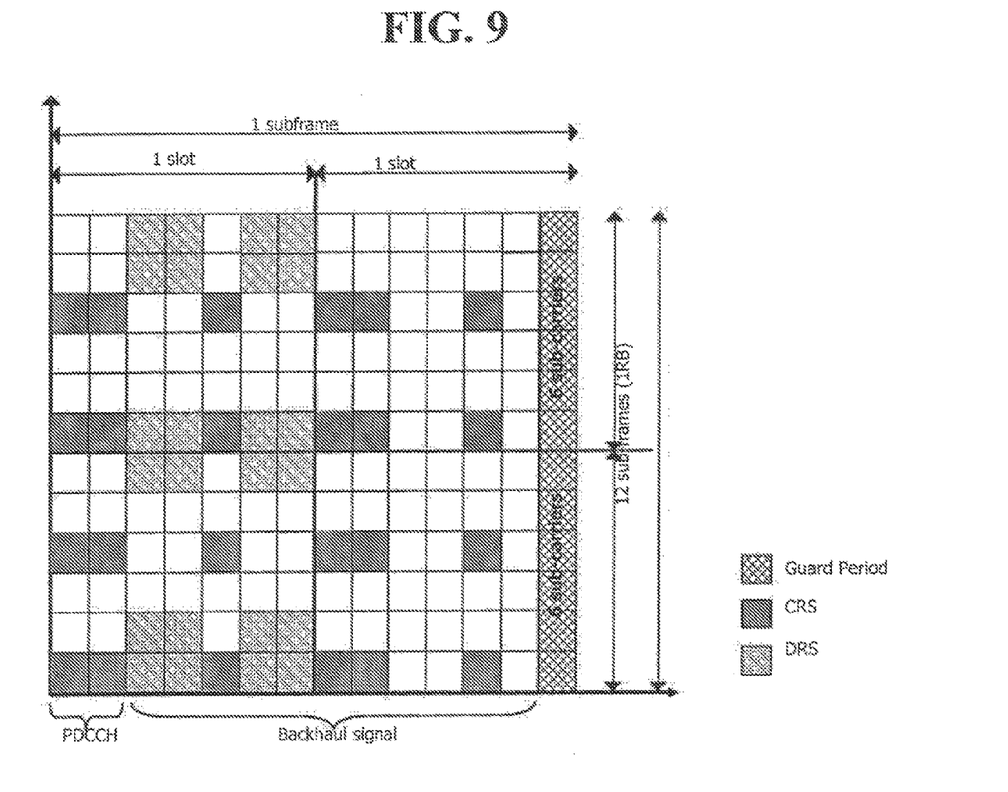
FIG. 9 illustrates a reference signal allocation in a backhaul link in accordance with another exemplary embodiment.

FIG. 9 illustrates a reference signal allocation in a backhaul link in accordance with another exemplary embodiment.

FIG. 9 shows a case where the last OFDM symbol of the backhaul subframe has been set not to be used as a backhaul signal. Unlike FIG. 8, use of the UE specific RS or dedicated RS may not be unable in the last OFDM symbol and the last OFDM symbol is allocated as a guard period. In this case, a DRS pattern designed in DwPTS area of a special subframe having 9 or 10 OFDM symbols in TDD mode may be used in a backhaul signal area as illustrated.

Therefore, the backhaul signal is started from the third OFDM symbol to which the DRS is allocated and the maximum PDCCH size of each of the base station and the relay node may correspond to two OFDM symbols or one OFDM symbol. The PDCCH may include a guard period in some cases.

As described above with reference to FIGS. 7, 8 and 9, the DRS pattern applied to an actual backhaul link may be determined according to the setup of the backhaul signal area. When the last OFDM symbol has been set to be used for the backhaul signal transmission and reception, the DRS pattern in the backhaul link subframe may be configured the same as the DRS pattern in a normal subframe (FIG. 7). However, when the last OFDM symbol has been set not to be used for the backhaul signal transmission and reception, the DRS pattern in the backhaul link subframe may be configured the same as the DRS pattern of DwPTS of the special subframe (FIGS. 8 and 9).

If the OFDM symbol #12 preceding the last OFDM symbol is used as a backhaul link, it may be preferable to use the DRS pattern of DwPTS having a size of 11 or 12 OFDM symbols for covering both slots of one subframe.

As such, the pattern of the reference signal to be used in the backhaul subframe may be determined by the back haul subframe configuration without a separate signal. Alternatively, after determining the configuration of the backhaul subframe, a reference signal pattern proper to be used in the configuration may be transmitted to a relay node through a high layer signaling.

Also, when a backhaul link consists of a plurality of component carriers through a carrier aggregation technique, a subframe configuration scheme according to a frequency band, similar to a per-band configuration for a backhaul subframe, may be utilized. If two component carriers are present within the same frequency band, one component carrier operation (DL backhaul reception) may be subject to interference due to another component carrier operation (DL access transmission). Hence, in order to avoid the carrier interference, all the component carriers present within the same frequency band may be set to have the same subframe configuration (backhaul subframe position, start/end position of a backhaul signal, PDCCH size, etc.). That is, all of the component carriers present within the same frequency band may share the same backhaul subframe configuration message. On the contrary, if two component carriers are present in different frequency bands (for example, a first carrier is present at 600 MHz, and a second carrier is present at 2 GHz), the operations of the respective component carriers may be carried out independent of each other. That is, the configuration messages for the component carriers present in the different frequency bands may be transmitted with respect to the corresponding frequency bands.

The method according to the present disclosure, as described so far, can be implemented by hardware or software, or any combination thereof. For example, the method according to the present disclosure may be stored in a storage medium (e.g., an internal memory of a mobile terminal, a flesh memory, a hard disc, etc.). Alternatively, the method according to the present disclosure can be implemented as codes or command words within a software program capable of being executed by a processor (e.g., a microprocessor within a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A signal transmission method by a base station to a relay node in a relay communication system, the method comprising:

transmitting a downlink signal to the relay node via a signal transmission period of a downlink subframe, wherein an end symbol of the signal transmission period is determined according to whether downlink subframe boundary of the base station and downlink subframe boundary of the relay node are time aligned.

2. The method of claim 1, wherein configuration information including symbol position of the signal transmission period is transmitted via a higher layer signaling.

3. The method of claim 1, wherein if the downlink subframe boundary of the base station and downlink subframe boundary of the relay node are time aligned, the end symbol of the signal transmission period is a second-to-last symbol of the downlink subframe.

4. The method of claim 1, wherein if the downlink subframe boundary of the base station and downlink subframe boundary of the relay node are not time aligned, the end symbol of the signal transmission is a last symbol of the downlink subframe.

5. The method of claim 1, wherein downlink subframe from the base station is configured as a Multicast Broadcast Single Frequency Network (MBSFN) subframe.

6. The method of claim 2, wherein the configuration information comprises at least a position of a start symbol or a position of a last symbol of the signal transmission period.

7. A signal transmission apparatus in a relay communication system, the apparatus comprising:
   a transmitter configured to transmit a downlink signal to relay node via a signal transmission period of a downlink subframe,
   wherein an end symbol of the signal transmission period is determined according to whether downlink subframe boundary of a base station and downlink subframe boundary of the relay node are time aligned.

8. The apparatus of claim 7, wherein configuration information including symbol position of the signal transmission period is transmitted via a higher layer signaling.

* * * * *